(No Model.) 2 Sheets—Sheet 2.
R. W. JAMIESON.
ANGLE GEARING.
No. 596,884. Patented Jan. 4, 1898.
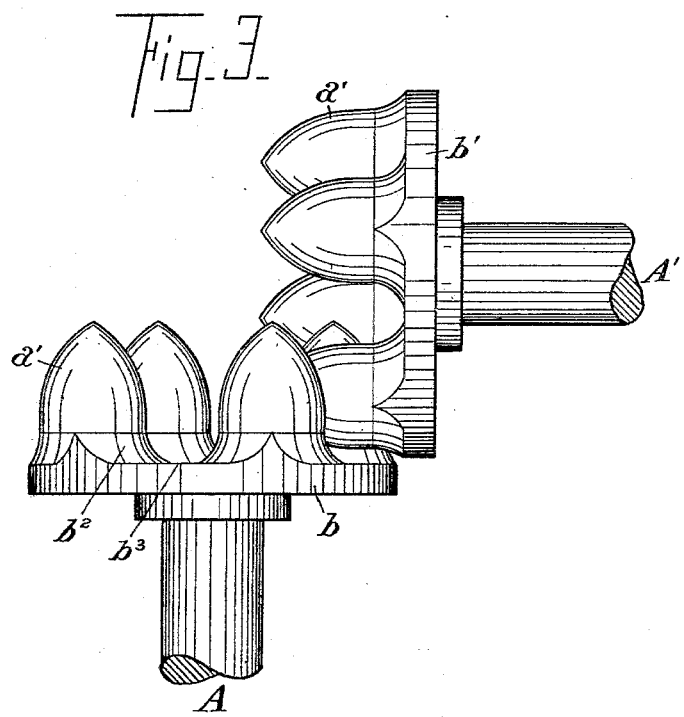
WITNESSES
J. H. Sims
A. R. Selden
INVENTOR
Robert W. Jamieson
BY
Howard L. Osgood
ATTORNEY

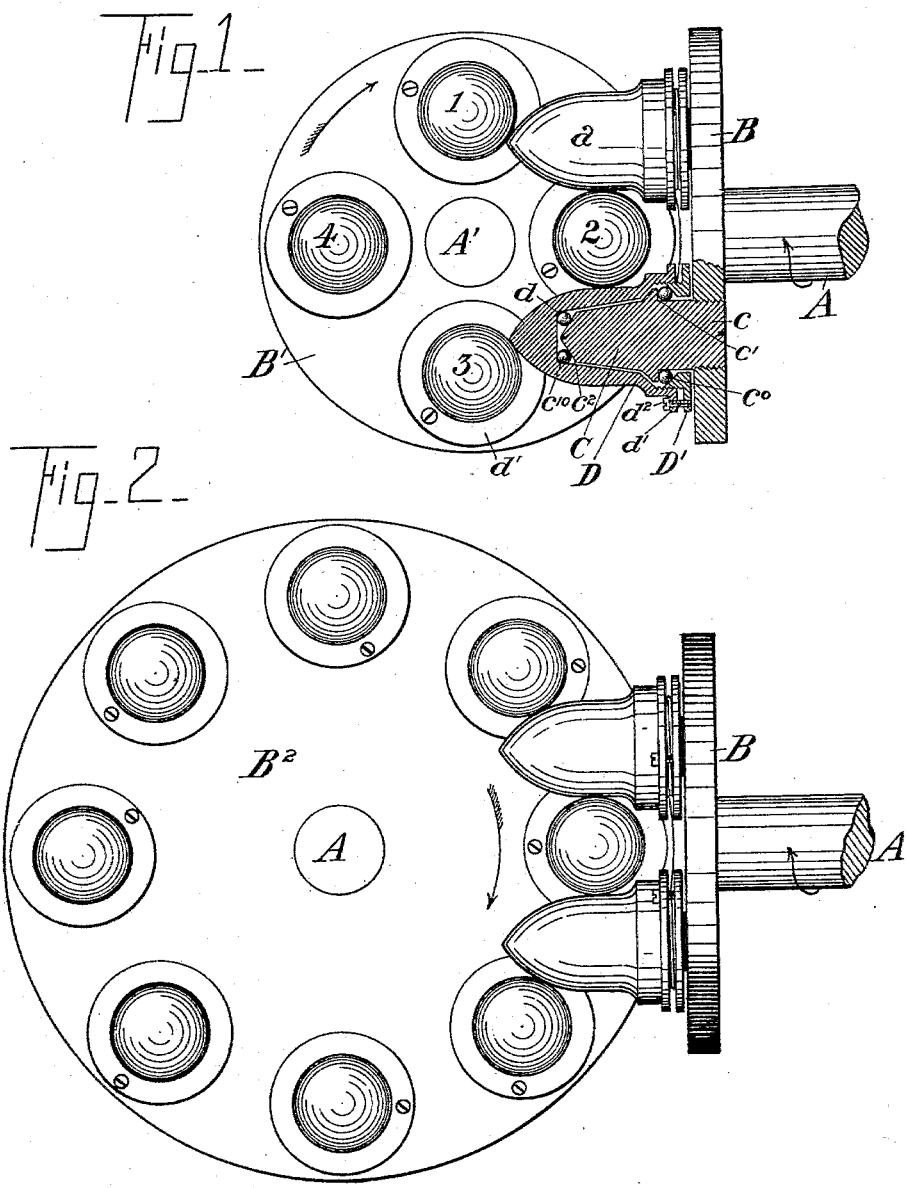

UNITED STATES PATENT OFFICE.

ROBERT W. JAMIESON, OF ROCHESTER, NEW YORK, ASSIGNOR TO H. A. LOZIER, OF CLEVELAND, OHIO.

ANGLE-GEARING.

SPECIFICATION forming part of Letters Patent No. 596,884, dated January 4, 1898.

Application filed May 17, 1897. Serial No. 636,930. (No model.)

*To all whom it may concern:*

Be it known that I, ROBERT W. JAMIESON, a citizen of the United States, and a resident of the city of Rochester, county of Monroe, and State of New York, have invented certain new and useful Improvements in Angle-Gearing, of which the following is a specification, reference being had to the accompanying drawings, in which—

Figure 1 is an elevation of a pair of my gears for transmission of equal rotations, one tooth being shown in section. Fig. 2 is an elevation of my gears for transmission of increased or reduced rotations, and Fig. 3 is a top plan view of a pair of my gears.

The object of my invention is to reduce to a minimum the very great friction which is found in the use of bevel-gears and to accomplish other purposes hereinafter stated.

In the drawings, A is a rotary shaft bearing in cases where the shaft is small a plate B. The plate is merely a support for the gearing devices hereinafter described and is ordinarily set in a plane to which the axis of the shaft A is perpendicular. In the form of device shown in Fig. 1 there are two rotary members A A', each carrying a plate, as B and B', the two plates being equal in size, as in Fig. 1, and at suitable equal distances from each other in a circle drawn from the axis of the shaft A or A' are arranged on each plate a series of rotary roller-teeth which are adapted in the two series to intermesh with each other, and thus one shaft becomes the driver and the other the driven shaft.

In Fig. 1, A is the driving member, and A' is the driven member. In the circle above mentioned, drawn from the axis of each shaft, are bored through the plate B a series of tapped holes, in which are fastened a series of axes or bearing-cones C, having a screw-threaded portion $c$ to fasten into the plate B, a flange $c'$ to form with the adjacent portion of the pin C one portion of the raceway for the balls $c^0$, and having on the end of said pin a conical surface $c^2$ to form one part of a ball-race for the balls $c^{10}$. The pin C is conoidal, substantially as shown, and is largest near its base. It may be fastened to the plate in any suitable manner, as by a pin or stud passing through the plate, with a screw and nut on the extremity. Around and over the pin C is a roller or shell D, which in the form of device shown is pointed and conoidal in form. The interior of the shell D has a ball-race $d$ to correspond and coöperate with the ball-race on the end of the pin C, formed by the conical surface $c^2$. The larger end of the shell D swells out to pass over the flange $c'$ of the pin C and then extends downward in cylindrical form and is provided with a flange $d'$. Into this flange is screwed a ring D', which is provided with a conical surface to correspond and coöperate with the flange $c'$ to form a ball-race for the balls $c^0$. A locking-screw $d^2$ serves to hold the ring D' and the shell D together, so that the ring cannot turn with reference to the shell. As shown in Fig. 1, the plates B and B' have each four of these antifriction-teeth upon them—1 2 3 4 and $a$ and C. Of course on the plate B, being shown in elevation, the pairs of teeth are in line, so that in fact there is a tooth directly behind the tooth $a$ and another tooth directly behind the shell D. If the shaft A revolves, as indicated by the arrow, the shaft A' will be driven, as indicated by the arrow, on the plate B'. As the shaft A' revolves in the direction shown by its arrow the four teeth upon the disk B will intermesh with the four teeth upon the disk B' and, pressing successively upon the same, will drive the disk B', and thus the shaft B will be driven. Each of the teeth is provided with ball-bearings, as above described, and the friction of each tooth rolling upon the other is reduced to a minimum. In case of wear on any tooth or damage thereto it is easily removable to be replaced, particularly as each tooth is like every other tooth, and thus my device is an important improvement over angle-gears of the usual form, in which, if a tooth is broken or worn to a detrimental degree, the whole gear-wheel must be replaced.

In Fig. 2 is shown a pair of my angle-gears, one of which, the smaller, has four teeth, and the other of which, B², has eight teeth.

In Fig. 2 is shown a top plan of a pair of my angle-gears exhibiting the intermeshing from a different point of view from that in Figs. 1 and 2. The plates $b$ and $b'$ are cut away, as at $b^3$, leaving a series of projecting portions $b^2$, on which are set the pins or teeth $a'$. It will be noticed in this view that the parts are so proportioned that the teeth only make contact.

I do not limit myself to the arrangement of the teeth to form circular gears, as herein shown, but the same may be oval, square, or of any other such form as may be necessary, and it is obvious that the same may be produced without departing from the invention herein set forth. My invention is the first one known to me in which there is a pair of revolving members, having a series of rotary roller-teeth upon them, each provided with internal and antifriction devices and each rolling longitudinally upon another tooth toward its extremity when the two are in operative and moving contact, and each so shaped and adjusted as to produce close intermeshing of the pins of one series between the pins of the other series. It is obvious from Fig. 1 that this close intermeshing is due to the shape of the tooth, which is a conoid. Of course these pins may run to a point, as shown in Fig. 1, or they may be truncated, as desired, or if it is not desired to have close intermeshing and an entire absence of backlash the pins may be cylindrical with rounded ends.

In any case the main characteristic or leading feature of the invention is present wherever the result described is produced by giving to the contact-surface of any portion or portions of each of the intermeshing rotary roller-teeth a curvature other than that of a cylinder. The working surface of each tooth when thus constructed curves inwardly toward its axis and toward its free end and is substantially a sine conoid.

While the drawings show shafts set at right angles to each other, my device is adaptable to shafts running at other angles to each other, whether acute or obtuse.

The angles of the teeth with reference to the axes of rotation of their supports may be varied within wide limits, and I do not limit my claims in this respect.

What I claim is—

1. In angle-gearing, two series of intermeshing rotary roller-teeth, the working surface of each tooth curving inwardly toward its axis and toward its free end.

2. In angle-gearing, two series of intermeshing rotary roller-teeth, each tooth having a contact-surface which is substantially a sine conoid.

3. In angle-gearing, two series of intermeshing rotary roller-teeth, the working surface of each tooth curving inwardly toward its axis and toward its free end, and antifriction devices for each tooth.

4. In angle-gearing, two series of intermeshing rotary roller-teeth, the working surface of each tooth curving inwardly toward its axis and toward its free end, each roller-tooth having a closed outer end and turning upon an internal support, and antifriction devices interposed between said roller and support.

5. In angle-gearing, a pair of revoluble members, as the plates B B', arranged at an angle with each other, each bearing a series of teeth for intermeshing with the teeth on the other plate, each tooth consisting of a central pin C, an outer shell D closed at the free end, and revolving antifriction devices interposed between the shell and the pin.

6. In angle-gearing, a pair of revoluble members, as the plates B B', arranged at an angle with each other, each having a series of fixed pins C provided with end and base ball-races, and a revoluble shell fitting over said pin and provided with ball-races coöperating with the ball-races on the pin, and balls in said ball-races.

7. In angle-gearing, the combination of a pair of revoluble members, as the plates B B', arranged at an angle with each other, each having a series of fixed pins C, each pin provided with a flange $c'$ and a conical end $c^2$, a conoidal shell D fitting over said pin and provided with a ring D' adapted to screw into the base of said shell and to form, with said flange $c'$, a base ball-race, said shell having also a surface or angle $d$ to form an end ball-race, and balls in said ball-races.

ROBERT W. JAMIESON.

Witnesses:
W. C. KOHLMETZ,
H. L. OSGOOD.